June 30, 1964 — L. J. STUCKENS — 3,139,017
PHOTOCOPY DEVICE

Filed Dec. 27, 1957 — 3 Sheets-Sheet 1

INVENTOR
LEO J. STUCKENS
by:
ATTY.

June 30, 1964
L. J. STUCKENS
3,139,017
PHOTOCOPY DEVICE
Filed Dec. 27, 1957
3 Sheets-Sheet 2
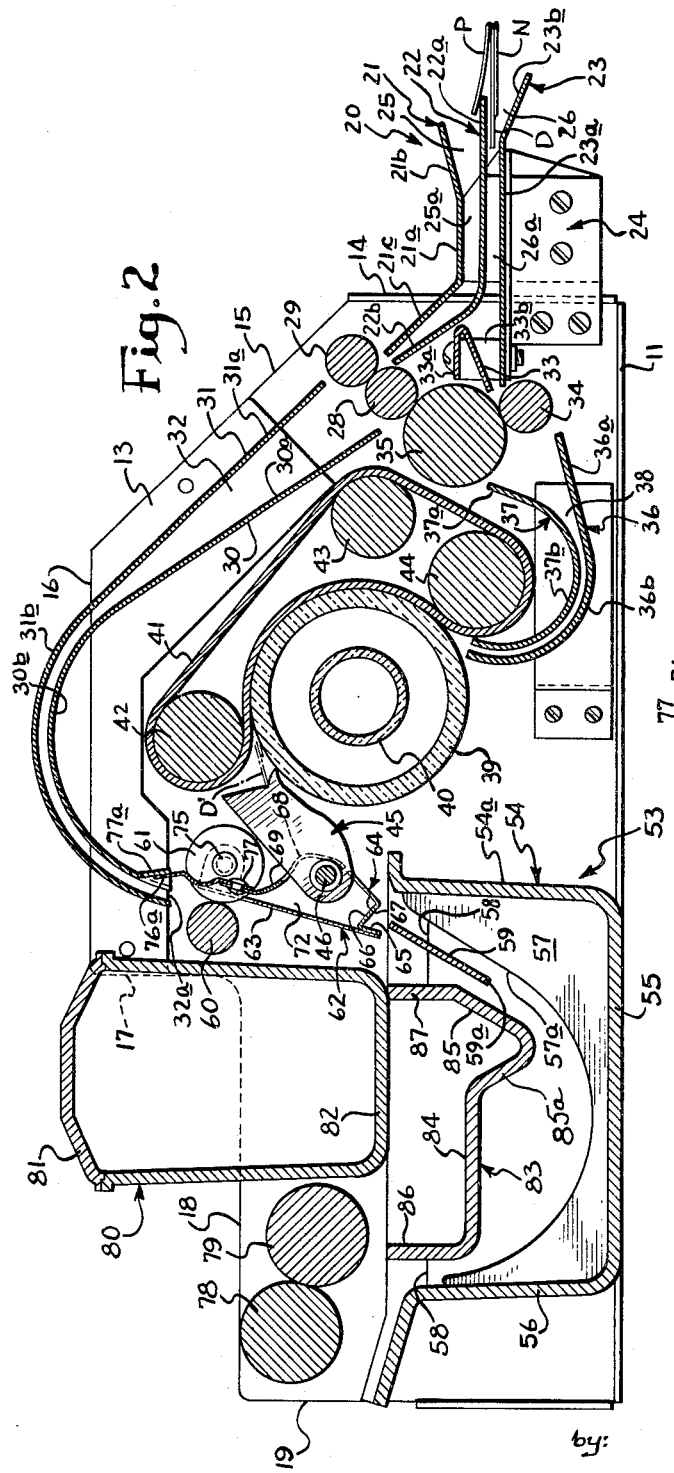
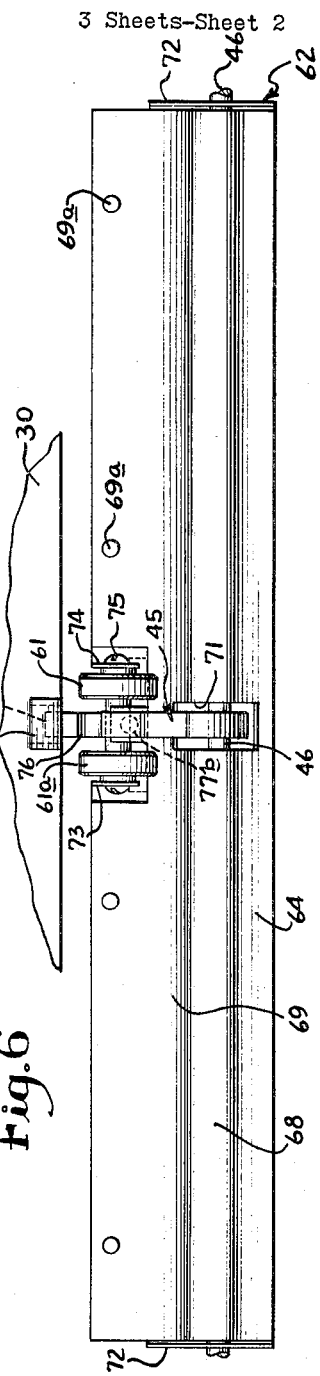
INVENTOR
LEO J. STUCKENS
by: ATTY.

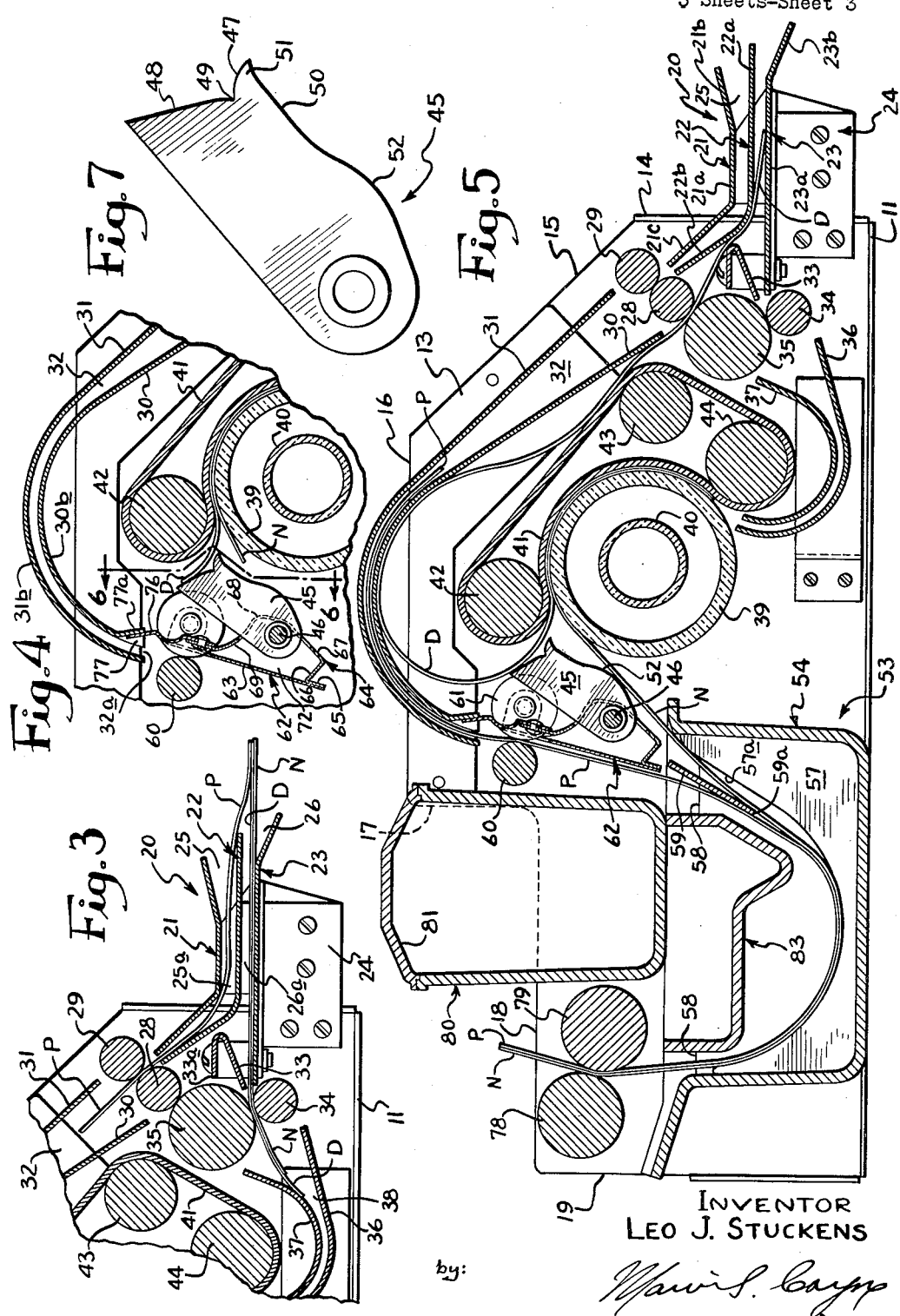

3,139,017
PHOTOCOPY DEVICE
Leo J. Stuckens, Chicago, Ill., assignor to American Photocopy Equipment Company, Chicago, Ill., a corporation of Illinois
Filed Dec. 27, 1957, Ser. No. 705,520
10 Claims. (Cl. 95—75)

This invention relates to an automatic apparatus for the production of photocopies by means of the so-called "transfer" process.

In the transfer process, the document or other material to be copied is first placed into face-to-face contact with a negative sheet of photosensitive paper, and the two sheets are then exposed to light, usually by the "reflex" method, so as to form a latent photographic image in the negative sheet. The latter is then separated from the document and placed into face-to-face contact with a positive sheet and the two sheets are then immersed in a developing solution and placed together between a pair of rollers so as to cause the image to be transferred from the negative sheet to the positive sheet. The two sheets are then peeled apart and the image-bearing positive sheet becomes the final photocopy product.

As heretofore practiced in the prior art, two independent apparatuses were required for the exposure and development steps respectively. The document and the negative photosensitive sheet were first manually inserted into the exposure apparatus. After the exposure, it was necessary for the operator to take the document and negative sheet from the exposure apparatus, manually separate them, manually place the negative sheet into face-to-face contact with a positive sheet, and then manually insert the two sheets into the developing apparatus.

These manual operations involved in taking the negative sheet from the exposure apparatus and feeding it into the developing apparatus together with a positive sheet are inconvenient, time-consuming and otherwise disadvantageous.

In order to obviate these disadvantages, the novel apparatus in accordance with the present invention is fully automatic once the sheets have been inserted therein, and does not require any manual manipulation by the operator until the entire process is completed and the adhered negative and positive sheets are ready to be pulled apart. That is, the operator merely inserts the negative and positive sheets, together with the document sheet to be copied, into the apparatus whereupon the latter functions automatically to expose the negative sheet, to separate the document sheet from the negative sheet, to return the document sheet to the operator, to place the negative sheet into face-to-face contact with the positive sheet, and to pass the negative and positive sheets through a developer solution and then between a pair of pressure rollers to cause the image to be transferred to the positive sheet. The adhered positive and negative sheets are then discharged from the apparatus and the operator need merely separate the positive sheet constituting the photocopy.

By thus rendering the process automatic, the technique of making photocopies becomes faster, simpler, more convenient, more economical, and less subject to variations and defects due to manual manipulation. That is, the automatic operation by means of the present apparatus provides a more uniform and more reliable quality standard for the photocopies than can generally be obtained by the ever-varying conditions and inherently non-uniform nature of manual operation.

Another important feature of the present invention resides in a novel device for separating the document sheet and the negative sheet after the exposure step. In the sheet handling apparatuses heretofore known in the prior art, this separation is usually obtained by a pneumatic or suction device, or by means of a movable deflector element which is moved to alternate positions by a cam mechanism or by electrical solenoids. These prior art separator devices have proven to be complicated, expensive and unreliable in operation.

The novel sheet separator device of the present invention is relatively simple and inexpensive as to its construction, and its mode of operation is extremely reliable in that the device is actuated solely by the thrust of one of the sheets to be separated, thereby eliminating the possibility of any failure or maladjustment of an auxiliary actuating mechanism or pneumatic means as heretofore employed.

Referring to the drawings wherein is illustrated a preferred embodiment of the invention:

FIG. 2 is a vertical sectional view taken on line 2—2 of FIG. 1 and shows the document sheet together with the negative and positive sheets in their positions assumed when being inserted into the apparatus;

FIG. 3 is a vertical sectional view of the portion of the apparatus adjacent the entrance opening and shows the positions of the sheets after the positive sheet has been separated from the negative sheet and the document sheet;

FIG. 4 is a vertical sectional view of the portion of the apparatus adjacent the separator device which separates the negative sheet from the document sheet after the exposure step;

FIG. 5 is a vertical sectional view similar to FIG. 2 but showing the negative and positive sheets being ejected from the transfer rollers and the document sheet being returned through the entrance opening;

FIG. 6 is a sectional view taken on line 6—6 of FIG. 4; and

FIG. 7 is an enlarged detail view of the kicker or separator element.

Figure 1:
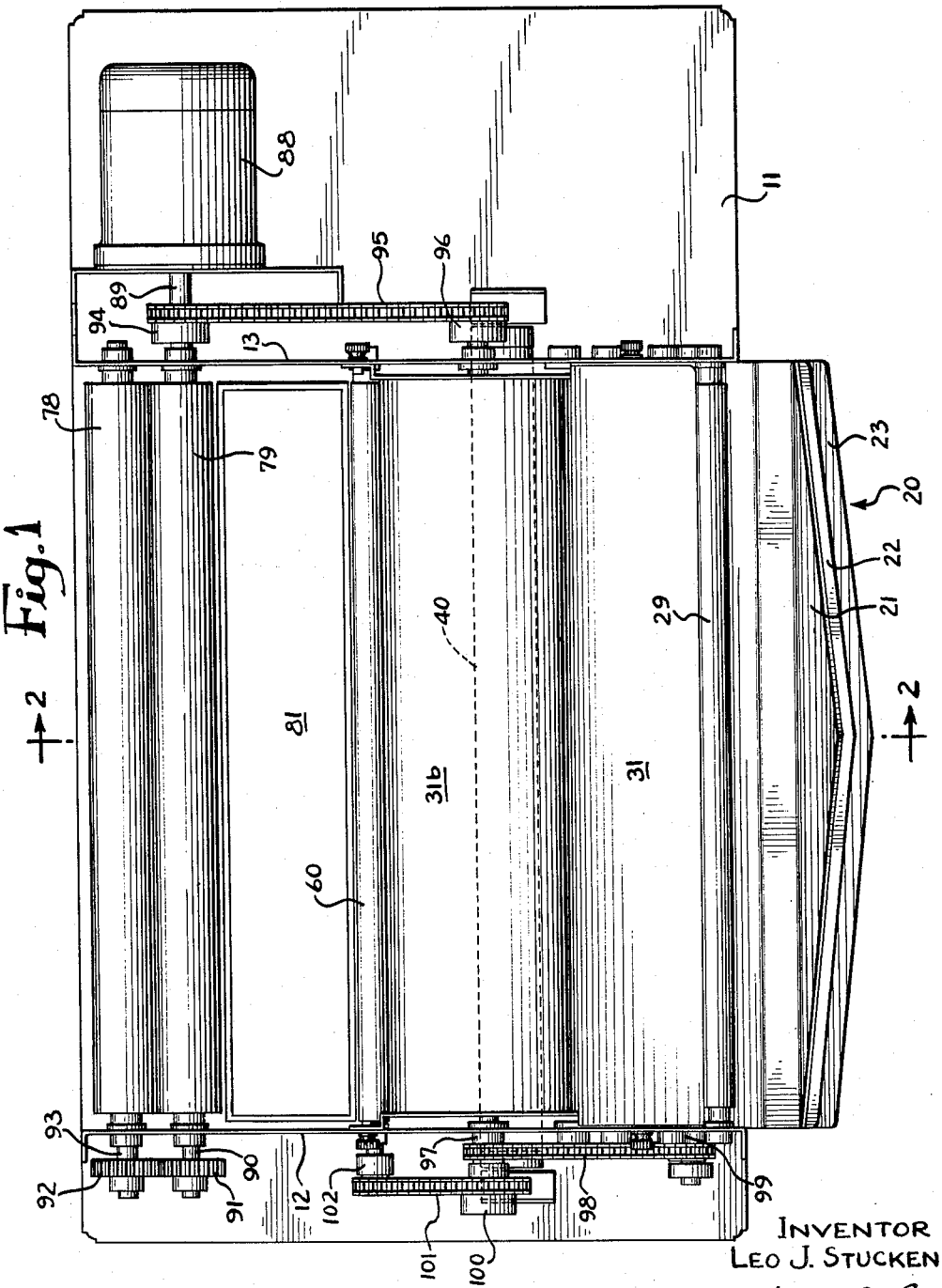
FIG. 1 is a plan view of a desk-type photocopy apparatus embodying the present invention, with the outer casing eliminated for clarity in illustration.

Referring first to FIGS. 1 and 2, the reference numeral 11 indicates a horizontal planar base member of approximately rectangular configuration. Fixedly secured to base member 11 and extending upwardly therefrom are a pair of spaced parallel walls 12, 13 each having a substantially vertical front edge 14 leading to a rearwardly inclined edge 15 which extends to an upper horizontal edge 16. The latter terminates in a vertical edge 17 which leads downwardly to a rear horizontal edge 18 which in turn extends to a rear vertical edge 19.

At the front of the apparatus (to the right as viewed in FIGS. 2 to 5) there is a sheet inlet means indicated generally by the reference numeral 20 and comprising a plurality of vertically spaced guide plates 21, 22, 23 fixedly secured to supporting means indicated generally by the reference numeral 24. The uppermost guide plate 21 comprises a rearwardly and downwardly inclined portion 21b integral with a horizontal intermediate portion 21a which is in turn integral with an upwardly rearwardly inclined portion 21c. The middle guide plate 22 comprises a horizontal portion 22a integral with a rearwardly upwardly inclined portion 22b. The lowermost guide plate 23 comprises an upwardly rearwardly inclined portion 23b integral with a horizontally extending portion 23a.

As shown in FIG. 1, the forward edges of guide plates 21, 22, 23 are each V-shaped, each half of each edge being straight and extending angularly outwardly toward the center where it converges at an apex with the other half of the respective edge. Although all three guide plates are disclosed as being V-shaped in this manner, the operation of the device would not be affected if the forward edges of the uppermost and lowermost guide plates 21, 23 were made straight. This is because the V-shaped contour of the middle guide plate 22 is the only one which serves a functional purpose, the forward edges of the other guide plates 21, 23 being made to conform to the contour of middle guide plate 22 solely for reasons of appearance.

The document sheet to be copied is designated by the reference letter D, the negative sheet by the reference letter N, and the positive sheet which eventually becomes the final photocopy product is designated by the reference letter P.

Referring first to FIG. 2, the three sheets D, N, P are fed into the apparatus by the operator in the following manner. The operator first places the three sheets together in contacting superimposed relation with the positive sheet P uppermost, the negative sheet N lowermost, and the document sheet D sandwiched therebetween. The photosensitive face of negative sheet N is placed in face-to-face contact with that face of document sheet D which has the matter to be copied. The intermediate document sheet D is placed so that its leading edge extends preferably about ¼ inch beyond the leading edges of negative sheet N and positive sheet P. This lead is preferably at least about 3/16 inch to actuate the separator mechanism, as will be explained below. Positive sheet P has its coated transfer-receiving surface facing downwardly.

The operator then moves the stack of superimposed sheets toward the guide plates 21, 22, 23 until the leading edge of document sheet D is under the forward edge of middle guide plate 22. The stack is then raised upwardly so as to flip the leading edge of positive sheet P above the forward edge of guide plate 22, and the stack is then thrust forwardly to cause guide plate 22 to separate positive sheet P from the two lower sheets D, N which remain in contacting relation until they are separated in the manner described below.

If desired, the forward edge of middle guide plate 22 may be made straight, in which case the sheets are separated by orienting the stack at an angle so as to enable the straight middle guide plate to separate positive sheet P by engaging between the corners of the leading edges of the document and positive sheets D, P.

It will be seen that the space between uppermost guide plate 21 and middle guide plate 22 forms an inlet opening, indicated by the reference numeral 25, which leads into a guideway 25a. Similarly, the space between middle guide plate 22 and lowermost guide plate 23 provides an inlet opening 26 leading to a lower guideway 26a.

After positive sheet P is separated from the other two sheets in the manner described above and illustrated in FIG. 2, the operator continues to thrust the three sheets rearwardly so that the leading edge of positive sheet P moves through the upper guideway 25a and the superimposed contacting negative and document sheets N, D travel through the lower guideway 26a. The guide plate portions 21c and 22b converge toward a pair of contacting rollers 28, 29 so as to cause positive sheet P to pass between and be drivingly engaged by the rollers.

Secured to the side walls 12, 13 and extending substantially entirely across the space therebetween are a pair of guide plates 30, 31 having upwardly rearwardly inclined portions 30a, 31a, respectively, formed integral with parallel arcuate portions 30b, 31b. The guide plates 30, 31 cooperate to form a guideway 32 therebetween. The latter guides positive sheet P from the drive rollers 28, 29 rearwardly and upwardly and then downwardly out through the exit end 32a of guideway 32.

While the positive sheet P is traveling through the guideways 25a, 32, document sheet D and negative sheet N will travel through the guideway 26a and will be directed by the rear edge of guide plate portion 23a and an auxiliary downwardly inclined guide plate 33 toward and between a second pair of rollers 34, 35. Guide plate 33 has integral therewith a horizontal flange 33a secured to a support member 33b mounted on support means 24. Adjacent rollers 34, 35 are a pair of guide plates 36, 37 having rearwardly and downwardly converging portions 36a, 37a, respectively, and upwardly curved arcuate portions 36b, 37b. It will be seen that the space between guide plates 36, 37 constitutes a guideway 38 for guiding negative sheet N and document sheet D as the latter two sheets pass between and rearwardly from rollers 34, 35. Guideway 38 directs the negative and document sheets to a well-known exposure means now to be described.

The exposure means comprises a hollow plastic or glass cylinder 39 which is preferably transparent or at least translucent. Cylinder 39 extends horizontally and longitudinally between side walls 12, 13 and is mounted for free rotational movement about its axis by any suitable mounting means (not shown) well known to those in the art. Extending axially through cylinder 39 is a fluorescent tube or other light source 40. A conventional flexible rubber or plastic belt 41 extends around a segment of the exterior surface of cylinder 39 and in contact therewith. Belt 41 is continuous and extends around three rollers designated 42, 43, 44 respectively, and is kept under tension.

It will be seen that as the rollers 42, 43, 44 are drivingly rotated by an arrangement to be described below, the belt 41 travels in contact with cylinder 39 in a counter-clockwise direction about the axis of the latter as viewed in FIG. 2. This movement of the belt 41 will also cause corresponding rotation of cylinder 39 frictionally engaged therewith. Guideway 38 will direct negative sheet N and document sheet D from rollers 34, 35 to the initial point of tangency of cylinder 39 and belt 41 whereupon these two sheets will be gripped between cylinder 39 and belt 41 and carried therebetween in a counter-clockwise direction about the axis of cylinder 39 throughout the path of contact of the belt 41 therewith. During this interval, the light rays from the light source 40 will radiate outwardly so as to be transmitted through the transparent or translucent cylindrical wall of cylinder 39. The light rays will then pass through the negative sheet N and strike the image-bearing front face of document sheet D, from which the light rays will be reflected back to the photosensitive layer coated on the front face of negative sheet N and thereby produce a latent photographic image in negative sheet N by the so-called "reflex" method.

After this exposure step, negative sheet N and document sheet D travel to the separator device now to be described. Referring first to FIGS. 2 and 6, the reference numeral 45 designates generally a separator or kicker member mounted for free rotational movement on a horizontal shaft 46. As best seen in FIG. 7, the outer end of kicker 45 comprises an arcuate surface 47 intersecting with another surface 48 angularly inclined with respect thereto to form a recess or notch 49. The outer end of edge 47 intersects with a lower edge 50 to form a lip 51. The lower edge 50 extends downwardly and rearwardly to a convex edge 52.

Referring again to FIG. 2, it will be seen that the center of gravity of kicker 45 is located forwardly of shaft 46 so that kicker 45 will be normally urged by the force of gravity in a clockwise direction and will normally be so positioned that the lip 51 rests upon the exterior surface of cylinder 39. As document sheet D and negative sheet N travel outwardly and rearwardly from between belt 41 and cylinder 39, the leading edge of document sheet D will engage and enter the recess 49 as shown by the dash-dot lines in FIG. 2 wherein the document sheet in this initial engaging position is indicated by the reference letter $D^1$.

It will be understood that if the leading edge of the document sheet droops slightly so as to first make contact with the arcuate edge 47, or is slightly elevated so as to first strike the edge 48, these edges will guide the leading edge of the document sheet toward and into the recess 49. Due to the fact that the sheets were initially inserted into the apparatus with the leading edge of document sheet D projecting about ¼ inch forwardly of the leading edge of negative sheet N, the latter does not make contact with kicker element 45 until after the following operation has occurred.

That is, continued movement of document sheet D will cause its leading edge to exert a thrust upon the separator or kicker 45. The line of this thrust extends rearwardly and above shaft 46 so as to exert a torque upon kicker 45 to rotate the latter upwardly in a counter-clockwise direction about shaft 46.

As kicker 45 rotates upwardly in response to the thrust exerted by document sheet D, the arcuate contour of edge 47 engages the lower surface of document sheet D to cause its leading edge to be raised outwardly of recess 49 and upwardly along the edge 48, as best shown in FIG. 4. Kicker 45 will have been rotated to its upward position before the leading edge of negative sheet N advances sufficiently to contact kicker 45. The leading edge of negative sheet N then contacts kicker 45 along the edge 50 thereof and slides downwardly along edge 50 and then along the convex edge 52. It will thus be seen that document sheet D and negative sheet N are thereby separated by kicker 45 which directs the sheets into different directions. The edge 48 of kicker 45 remains in contact with document sheet D so as to hold kicker 45 in its uppermost position while negative sheet N is passing beneath kicker 45 in contact with the convex edge 52 thereof, as best seen in FIG. 5. After the trailing edge of document sheet D has passed the outer extremity of edge 48, kicker 45 will be free to rotate in a clockwise direction down to its original normal position with its lip 51 resting upon cylinder 39.

After leaving the separator or kicker 45, the leading edge of document sheet D travels upwardly and strikes the lower surface of the curved portion 30b of guide plate 30, which then guides document sheet D around forwardly and downwardly between rollers 28, 35 and then outwardly of the apparatus through lower guideway 26a and lower inlet opening 26, as best shown in FIG. 5. After negative sheet N leaves kicker member 45 it passes through a developing tank 53 simultaneously with positive sheet P, as described below.

Developing tank 53 comprises a container 54 having a bottom 55 and upstanding walls. The upper end of container 54 is open except for the closure provided by an arrangement described below. Mouted in container 54 are a plurality of conventional guide plates 57 which extend in vertical parallel planes and are horizontally spaced from each other.

Container 54 is adapted to contain a developer solution of the conventional transfer process type, the normal level of the solution being indicated at 58. The upper edges 57a of guide plates 57 extend from the region adjacent the forward edge of container 54 downwardly into the developer solution below the level 58 and then upwardly out of the solution at the rear end of container 54.

Also mounted within container 54 is a separator plate 59 which extends downwardly toward the developer solution so as to have its lower end 59a located below the developer solution level 58. The separator 59 is inclined downwardly and rearwardly. The function of separator 59 is to maintain the respectively adjacent facing areas of sheet N and positive sheet P separated until these areas pass beneath the solution level 58, after which they may be allowed to come together as shown in FIG. 5.

While document sheet D and negative sheet N are being subjected to the operation of the exposure means 39, 40 and the kicker 45, the positive sheet P travels upwardly through guideway 32 and then arcuately around the upper portion of the latter and then downwardly through the exit end 32a thereof. Positive sheet P then passes between a drive roller 60 and idler rollers 61, 61a rotatably mounted on a swinging support structure indicated generally by the reference numeral 62.

As shown in FIG. 6 in conjunction with the other figures, support 62 comprises a rear planar member 63 secured to a front bulging member 64. Both members 63, 64 are preferably stamped of sheet metal. Front member 64 is provided with a lower marginal edge portion 65 secured by welding to the lower margin of rear member 63. Extending integrally from the portion 65 is a downwardly and forwardly inclined portion 67 which in turn leads to an outwardly curved portion 68 leading to a concave upper portion 69. The latter is in turn integral with a planar upper marginal portion secured by spot welding 69a to rear member 63.

The front support member 64 is provided with a rectangular opening 71 through which kicker 45 projects forwardly from within the hollow space between support members 63, 64. It will be seen that shaft 46 extends longitudinally through this hollow space. Rear support member 63 is provided at each of its opposite lateral edges with an integral flange 72 extending in a vertical plane and having a forward edge contoured to coincide with the shape of the front support member 64.

The opposite ends of shaft 46 project through suitable bearing apertures provided in flanges 72 whereby the entire support structure 62 is mounted for free swinging movement on shaft 46. If desired, the relatively long integral shaft 46 may be segmented to form three separately mounted coaxially aligned short shafts upon which may be rotatably mounted kicker 45 and the two opposite ends of structure 62 respectively.

The intermediate portion of rear support member 63 is provided with a pair of forwardly projecting integral flanges 73, 74 horizontally spaced from each other and extending in vertical planes adjacent the upper edge of member 63. A horizontal shaft 75 has its opposite ends secured within apertures provided in flanges 73, 74.

The pair of rollers 61, 61a are rotatably mounted on shaft 75 and are separated from flanges 73, 74 and from each other by conventional spacer sleeves. It will thus be seen that the entire support structure 62 may swing counter-clockwise (as viewed in FIG. 2) about the axis of shaft 46 so as to enable rollers 61, 61a to be maintained in contacting engagement with roller 60.

In order to urge the support structure 62 in its counter-clockwise direction, front support member 64 has secured to its upper edge an upstanding leaf spring 76. The latter has its lower end fixed to front support member 64 by a rivet 77b and its upper end 76a is engaged within a recess or pocket 77 formed in the rear end of the curved portion 30b of guide plate 30. The wall 77a of recess 77 urges the upper end 76a of leaf spring 76 rearwardly so as to bias the entire support structure 62 in a counter-clockwise direction about shaft 46 to maintain rollers 61, 61a in engagement with roller 60.

As negative sheet N passes below kicker 45, the convex edge 52 of the latter urges sheet N downwardly to maintain its leading edge out of contact with front support member 64 until sheet N is at such an angle that its leading edge will strike front support member 64 at an acute angle to the inclined portion 67 thereof, whereby the leading edge of sheet N will then be guided by portion 67 downwardly into the space between lower guides 57 and separator 59. Simultaneously with this downward movement of negative sheet N into the developing tank 53, positive sheet P passes downwardly from the outer exit end 32a of guideway 32, and then down between rollers 60, 61, 61a, and is then guided by the planar surface of rear support member 63 so as to enter developing tank 53 substantially simultaneously with negative sheet N. However, positive sheet P will be maintained separate from negative sheet N by separator 59 until both sheets pass below the level 58 of the developing solution so as to be wetted separately thereby.

After the respective facing adjacent areas of negative sheet N and positive sheet P have passed below the liquid level 58, they may be allowed to come into contact and the two sheets then continue to travel downwardly along the arcuate edges 57a of guide plates 57 and then upwardly at the rearward end of developer tank 53 to a pair of rollers 78, 79. As the sheets N and P pass between rollers 78, 79, the latter press the sheets together so as to cause a transfer of the photographic image from negative sheet N to positive sheet P. As the sheets leave rollers 78, 79, they are ejected through a suitable opening in the casing (not shown) of the apparatus. The two sheets remain adhered to each other and are grasped by the operator who waits a predetermined length of time, usually less than a minute, and then peels the two sheets apart. The negative sheet N is then discarded and the operator is thus provided with the final photocopy product in the form of positive sheet P.

The reference numeral 80 indicates generally a supply container for the developer solution and is provided at its upper open end with a cover 81. The bottom 82 of container 80 is located adjacent the upper edge of developer tank 53 and immediately above a trough indicated generally by the reference numeral 83. The latter has a rearwardly and upwardly inclined bottom wall portion 85a converging with respect to an upwardly forwardly inclined bottom wall portion 85, and a horizontal bottom wall portion 84. The rear end of trough 83 has a vertical end wall 86 spaced forwardly of the rear wall 56 of developer tank 53. Trough 83 also has a vertical front wall 87 spaced rearwardly of the separator plate 59.

Trough 83 extends transversely almost entirely across developer tank 53 from one side wall thereof to the other. It will thus be seen that the exposed surface of the developer solution is relatively small, comprising practically only the area between the trough rear wall 86 and container rear wall 56 and the area between trough front wall 87 and container front wall 54a. That is, trough 83 limits the exposed solution surfaces to relatively small areas at the inlet and outlet ends of developer tank 53. By thus limiting the exposed surface of the solution to two relatively small areas, the tendency of the developer solution to oxidize by contact with the atmosphere or to otherwise become contaminated, or to evaporate, is considerably reduced, and a large volume of developer solution may be maintained or stored within developer tank 53 for much longer periods before deterioration than was possible with the arrangements heretofore employed in the prior art.

In order to maintain the exposed surface areas of the developer solution relatively small, the solution level 58 must be maintained at a sufficient height with respect to trough 83. For this purpose, any suitable or conventional valve structure (not shown) may be employed to feed automatically the developer solution stored within supply container 80 into developer tank 53 in response to lowering of liquid level 58 so as to maintain the latter at the desired height.

It will thus be seen that positive sheet P travels from inlet opening 25 to rollers 78, 79 through a first path comprising guideway 25a, guideway 32, and then between rollers 60 and 61, 61a through developer tank 53. During this movement of positive sheet P through this path, negative sheet N travels from inlet opening 26 to rollers 78, 79 through a second path comprising guideway 26a, guideway 38, and then around cylinder 39, below kicker 45 and then through developer tank 53. In order to provide that negative sheet N and positive sheet P will emerge from rollers 78, 79 in adhered face-to-face relation with the leading edges of both sheets in approximate alignment, the length of the first path of positive sheet P is made substantially equal to the length of the second path of negative sheet N.

In order to drivingly rotate the several rollers which impel the three sheets through their respective paths in the apparatus, there is provided an electric motor 88 mounted on the rear right-hand portion of the support base 11. All of the rollers, except rollers 61, 61a, have their opposite ends rotatably mounted in conventional bearings in side walls 12, 13. Motor 88 has a shaft 89 drivingly connected to roller 79 at the right-hand end thereof (FIG. 1). The left-hand end of roller 79 is provided with an outwardly extending shaft 90 having fixedly secured thereto a gear 91 in engagement with a gear 92 fixedly secured to a shaft 93 secured to the left-hand end of roller 78. It will thus be seen that motor shaft 89 drivingly rotates roller 79 which in turn drives roller 78 in the opposite direction through the gears 91, 92.

Fixedly secured to motor shaft 89 is a toothed sprocket 94 having teeth engaged with the rear end of a drive chain 95 the forward end of which is engaged around a toothed sprocket 96 fixedly secured to a shaft integral with the right-hand end of roller 42. The left-hand end of the latter is provided with a shaft projecting outwardly through a suitable aperture in the left-hand side wall 12 and a toothed sprocket 97 is secured to this shaft. A drive chain 98 has its rearward end in engagement with sprocket 97 and its forward end is drivingly engaged with a sprocket 99 fixedly secured to the left-hand end of roller 35. It will thus be seen that motor 88 drives roller 42 through drive chain 95 so as to cause movement of belt 41 and thereby to rotate cylinder 39 in a counter-clockwise direction as viewed in FIG. 2. The drive torque of motor 88 is also transmitted to roller 35 through chain 98, and thereby drivingly rotates rollers 28 and 34 which are in frictional engagement with roller 35. Roller 29 is in engagement with roller 28 and will be driven thereby.

The left-hand end of roller 42 also has fixedly secured thereto a drive sprocket 100 engaged by a drive chain 101 which is also in engagement with a drive sprocket 102 fixedly secured to the left-hand end of roller 60, thereby transmitting a drive torque to the latter which in turn causes rotation of rollers 61, 61a in frictional engagement therewith.

Due to the lead of document sheet D, that is, the amount by which the leading edge of document sheet D projects forwardly beyond the leading edges of the other two sheets N, P when the sheets are initially inserted into the apparatus, the narrow marginal area of document sheet D adjacent its leading edge will not be reproduced in the final photocopy. In almost all instances this will be of no importance since very few documents have reproducible matter extending out to the very edge of the sheet on all sides and it is usually possible to orient the document so that this leading marginal area is blank. However, in those few instances where it is desired to reproduce the entire area of document sheet D, this may be accomplished in the present apparatus in the following manner.

A narrow strip of paper may be provided with a band of adhesive along one edge. This strip may be adhesively secured to the back of document sheet D with the non-adhesive edge projecting forwardly beyond the leading edge of document sheet D by an amount corresponding to the desired lead. This projecting portion of the adhered strip then becomes, in effect, a blank marginal extension of the document for actuation of kicker 45, and the original actual forward edge of document sheet D may be placed coincident with the forward edges of the other two sheets so as to reproduce the entire area of the document.

It will be understood that middle guide plate 22 exemplifies merely a preferred arrangement for separation of positive sheet P from the other two sheets N, D. Instead of this disclosed arrangement, there may be provided an additional kicker, somewhat similar in structure and mode of operation to kicker 45, located adjacent the entrance opening of the apparatus. This additional kicker will direct sheets D, N downwardly below the kicker and will direct sheet P upwardly to separate the latter sheet from the other two sheets. For example, the additional kicker may be merely an inverted version of the disclosed kicker 45, and may be normally biased upwardly by gravity or a spring so as to be pivoted downwardly upon engagement by the leading edge of document sheet D.

It is to be understood that the specific embodiment of the invention shown in the drawings and described in detail above is merely illustrative of one of the many forms which the invention may take in practice, and numerous changes and modifications thereof will readily occur to those skilled in the art without departing from the scope of the invention delineated in the appended claims which are to be construed as broadly as possible in view of the prior art.

I claim:

1. An apparatus for automatically producing photo copies from a stack of superimposed sheets to be edge fed thereto in a predetermined positional relation, wherein said stack comprises a negative sheet and a positive sheet and a document sheet therebetween with said document sheet having a forward marginal portion in advance of the other sheets, said apparatus comprising dual sheet inlet means for initially receiving said document sheet together with said negative sheet and said positive sheet, plate means separating said dual inlet means and being engageable by said forward marginal portion of said document sheet upon movement of said stack in a predetermined direction whereby said positive sheet is separated from said other two sheets upon movement of said stack in a direction to cause said plate to enter between said positive and document sheets, means for conveying said negative sheet and said document sheet in superimposed contacting relation, means for exposing said document sheet and said negative sheet to produce a latent photographic image in said negative sheet, means for separating said negative sheet and said document sheet from each other, means for discharging said document sheet from the apparatus, means for conveying said positive sheet from said inlet means to a point of meeting with said negative sheet, means for simultaneously conveying said positive sheet and said exposed negative sheet through a developer solution, and means for pressing said negative and positive sheets into face-to-face contact to transfer said image from said negative sheet to said positive sheet, the path lengths and speeds of said several conveying means being such that the positive and negative sheets enter said pressing means in substantially said predetermined positional relation.

2. An apparatus for automatically producing photo copies, said apparatus comprising sheet inlet means for receiving a stack of three superimposed sheets in contacting relation, said sheets including a negative sheet, a positive sheet and a document sheet to be copied; said positive and negative sheets having generally predetermined leading edge relationship with respect to each other in the direction in which said sheets are to be moved into said apparatus, said sheet inlet means having a pair of superimposed inlet openings, means for separating said positive sheet from said stack, and means for guiding said positive sheet into a first of said inlet openings and for guiding said negative and document sheets into the second of said inlet openings, means for conveying said negative sheet and said document sheet in superimposed contacting relation, means for exposing said document sheet and said negative sheet while the sheets are being conveyed in superimposed contacting relation to produce a latent photographic image in said negative sheet, means for separating said negative sheet from said document sheet, means for conveying said separated document sheet back to said sheet inlet means and through the latter outwardly of the apparatus, a developing tank adapted to contain developer solution, means for conveying said positive sheet from said first inlet opening to said developing tank, means for simultaneously conveying said exposed negative sheet and said positive sheet through said developing tank, and pressure means for pressing said negative and positive sheets together upon emergence from said developing tank, the path lengths and the speeds of the conveying means for said positive and negative sheets being so related as to cause said positive and negative sheets to arrive at said pressure means in substantially the same leading edge relation as mentioned hereinabove.

3. An apparatus for automatically producing photocopies, said apparatus comprising an exposure means, a developing tank, sheet inlet means for receiving a stack of three sheets in superimposed contacting relation, said sheets consisting of an original document sheet to be copied, a positive sheet and a negative sheet, said sheet inlet means having a first inlet opening and a second inlet opening, means for separating said positive sheet from said other two sheets, means for guiding said positive sheet through said first inlet opening, means for guiding said other two sheets through said second inlet opening, guide means forming a first sheet travel path extending from said first inlet opening to said developing tank, additional guide means forming a second sheet travel path extending from said second inlet opening past said exposure means and then to said developing tank, means for impelling said positive sheet along said first path, means for impelling said document sheet and negative sheet along said second path, sheet separator means located adjacent said second path between said exposure means and said developing tank for separating said document sheet from said negative sheet, other guide means forming a third sheet travel path extending from said sheet separator means to said sheet inlet means, means for impelling said document sheet along said third path and outwardly of the apparatus through said sheet inlet means, a pair of pressure rollers located adjacent said developing tank, said first path and said second path extending through said developing tank and then to said pressure rollers, the respective path lengths and speed of travel of said sheets in said first and second paths between said sheet inlet means and said pressure rollers being such that the leading edges of said positive and negative sheets will be in approximately the same above-mentioned superimposed relation upon entrance into said pressure rollers.

4. An apparatus for automatically producing photocopies, said apparatus comprising sheet inlet means for receiving a stack of three superimposed sheets in contacting relation, said sheets including a negative sheet, a positive sheet and an original document sheet to be copied and wherein said document sheet has a leading forward marginal portion in advance of said positive sheet, said sheet inlet means comprising a pair of superimposed openings and guide means engageable by said forward portion of said document sheet upon movement of said stack in a predetermined direction whereby said positive sheet is separated from said stack upon movement of said stack to cause said guide means to enter between said positive and document sheets, means for guiding said positive sheet into a first of said openings and for guiding said negative and document sheets into the second of said openings, means for conveying said negative sheet and said document sheet in superimposed contacting relation, means for exposing said document sheet and said negative sheet while the sheets are being conveyed in superimposed contacting relation whereby to produce a latent photographic image in said negative sheet, means for automatically separating said negative sheet from said document sheet after said exposure responsive to engagement by the leading edge of said document sheet, means for conveying said separated document sheet outwardly of the apparatus, a developing tank adapted to contain developer solution, means for conveying at least one of said negative and positive sheets through said developing tank, and pressure means for then pressing said negative and positive sheets into faceto-face contact, the path lengths and the speeds of the conveying means for said positive and negative sheets being so related as to cause said positive and negative sheets to arrive at said pressure means in substantially the same leading edge relation as mentioned hereinabove.

5. An apparatus for automatically producing photocopies, said apparatus comprising sheet inlet means for receiving a stack of three superimposed sheets in contacting relation, said sheets including a negative sheet, a positive sheet, and a document sheet to be copied wherein said sheets are to be edge fed to said apparatus in predetermined superimposed relation, said sheet inlet means comprising a pair of superimposed openings and guide means for separating said positive sheet from said stack and guiding said positive sheet into a first of said openings and for guiding said negative and document sheets into the second of said openings, means for maintaining said negative sheet and said document sheet in superimposed contacting relation, means for exposing said document sheet and said negative sheet while the sheets are being maintained in said superimposed contacting relation so as to produce a latent photographic image in said negative sheet, means for separating said document sheet from said exposed negative sheet, means for conveying said separated document sheet outwardly of the apparatus, a developing tank adapted to contain developer solution, means for conveying said exposed separated negative sheet through said developing tank, means for conveying said positive sheet from said inlet means to and through said developing tank, and pressure roller means for pressing said negative and positive sheets together upon emergence thereof from said developing tank, said conveying means for said positive and negative sheets being so constructed, and adapted to be operated at such relative speeds, as to feed said positive and negative sheets to said pressure roller means in said predetermined superimposed relation.

6. An apparatus for automatically producing photocopies, said apparatus comprising an exposure means, a developing tank, sheet inlet means for receiving simultaneously a stack of three sheets in predetermined superimposed contacting relation, said sheets consisting of a document sheet to be copied, a positive sheet and a negative sheet, all to be simultaneously edge fed to said apparatus, with said document sheet having a portion extending forwardly of the leading edges of the other sheets, said sheet inlet means having a first inlet opening and a second inlet opening, plate means having an edge engageable by the forwardly extending portion of said document sheet upon upward movement of said stack for separating said positive sheet from said other two sheets upon forward feeding thereof, and means comprising said plate means operative to guide said positive sheet through said first inlet opening, means for guiding said other two sheets through said second inlet opening, pressure means for pressing said positive and negative sheets into face-to-face contact, guide means forming a first sheet travel path extending from said first inlet opening to said pressure means, additional guide means forming a second sheet travel path extending from said second inlet opening past said exposure means and then to said pressure means, at least one of said paths extending through said developing tank, means for impelling said positive sheet along said first path, means for impelling said document sheet and negative sheet along said second path, sheet separator means located adjacent said second path for separating said document sheet from said exposed negative sheet after exposure, other guide means forming a third sheet travel path extending from said sheet separator means outwardly of the apparatus, and means for impelling said separated document sheet along said third path and outwardly of the apparatus, the respective lengths of said first and second paths between said sheet inlet means and said pressure means being approximately equal and the travel speeds of said sheets therethrough being approximately equal, whereby said positive and negative sheets are fed to said pressure means in substantially the same superimposed relation as upon entering said apparatus.

7. An apparatus for automatically producing photocopies, said apparatus having an exposure device and a developing tank, said apparatus comprising sheet inlet means for receiving a stack of three superimposed sheets in contacting relationship, said sheets including a negative sheet, a positive sheet, and a document sheet to be copied; said sheets having a generally predetermined leading edge relationship with respect to each other in the direction in which said sheets are to be moved into said apparatus, said sheet inlet means including a separating device for initially separating said positive sheet from said stack and said device being located adjacent said sheet inlet means, means for conveying said separated positive sheet through said apparatus to subsequently meet with said negative sheet, means for conveying said negative and document sheets to said exposure device in superimposed contacting relation to produce an image in said negative sheet to be transferred subsequently to said positive sheet, means for separating said negative sheet from said document sheet subsequent to said exposure device, means for conveying said separated document sheet outwardly of said apparatus, means for simultaneously conveying said exposed negative sheet and said positive sheets through said developing tank, pressure means for pressing said negative and positive sheets together upon emergence from said developing tank, the path lengths and the speeds of the conveying means of said positive and negative sheets being so related as to cause said positive and negative sheets to arrive at said pressure means in substantially the same leading edge relationship as mentioned hereinabove.

8. In an apparatus as set forth in claim 7, wherein both of said separating means comprise means whereby separation is effected in response to abutment of a sheet thereagainst, said stack to be fed to said apparatus with said sheet having an abutment edge extending forwardly of the edges of the other sheets in the direction of travel of said stack.

9. In an apparatus for automatically producing photocopies including an exposure section and a developing section and conveyor means, the improvement comprising sheet inlet means including a pair of adjacent openings for receiving a stack of superimposed sheets having a document sheet to be copied sandwiched between a positive sheet and a negative sheet and having a predetermined leading edge relationship, guide means between said openings for separating said positive sheet from said stack to guide said positive sheet into one of said openings and said superimposed document and negative sheets into the other of said openings, separating means for separating said document sheet from said negative sheet as they pass through the exposure section, means for moving said positive sheet towards the developing section, and means for moving said separated negative sheet towards the entrance of the developer section where it meets the positive sheet, the length of the paths of the negative and positive sheets and the speed of the conveying means moving them as they pass through the apparatus being correlated so that the two sheets arrive at and pass through the developer section with substantially their original leading edge relationship.

10. A fully automatic one step method of producing a copy from a document sheet in which a negative sheet is exposed to said document sheet and is thereafter wetted with a developer solution and pressed against a positive sheet, which comprises the steps of arranging the three sheets in a stack with the document sheet sandwiched between the positive sheet and the negative sheet, and having a predetermined leading edge relationship, feeding said stack forwardly past a separating station to separate the positive sheet from the stack, moving said positive sheet by a separate path toward the developer section while moving said document sheet and said negative sheet through an exposing section, and thereafter moving said document and negative sheets past a separating means to separate the document sheet from the negative sheet, moving said negative sheet in a path towards the entrance to the developer section where it meets the positive sheet, and correlating the lengths of the paths of the positive and negative sheets and the speeds of their travel so that the two sheets arrive at and pass through the developer section with substantially their original leading edge relationship.

References Cited in the file of this patent

UNITED STATES PATENTS

| | | |
|---|---|---|
| 2,401,203 | Trump | May 28, 1946 |
| 2,441,912 | Streich | May 18, 1948 |
| 2,559,159 | Hruby | July 3, 1951 |
| 2,732,778 | Limberger | Jan. 31, 1956 |

FOREIGN PATENTS

| | | |
|---|---|---|
| 739,019 | Great Britain | Oct. 26, 1955 |